United States Patent [19]

Baab et al.

[11] 4,079,401
[45] Mar. 14, 1978

[54] DIAPHRAGM PRESELECTOR FOR CAMERA OBJECTIVE

[75] Inventors: Albert Baab; Paul Himmelsbach, both of Bad Kreuznach, Germany

[73] Assignee: Jos. Schneider & Co. Optische Werke Kreuznach, Bad Kreuznach, Germany

[21] Appl. No.: 752,833

[22] Filed: Dec. 21, 1976

[30] Foreign Application Priority Data

Dec. 22, 1975 Germany .............................. 2557855

[51] Int. Cl.² .............................................. G03B 9/02
[52] U.S. Cl. ...................................... 354/272; 354/274
[58] Field of Search ....................... 354/272, 270, 274

[56] References Cited

U.S. PATENT DOCUMENTS 3,715,965  2/1973  Alfredsson ........................... 354/274

Primary Examiner—John Gonzales
Attorney, Agent, or Firm—Karl F. Ross

[57] ABSTRACT

An iris diaphragm of a reflex camera, spring-biased into a wide-open position, is settable to a preselectable stop position via a linkage including a cam follower on a swing ring oscillatable about an off-axial fulcrum. The cam follower coacts with a cam disk which is manually rotated against the force of a restoring spring during a windup operation and, upon subsequent release, displaces the cam follower and the swing ring which entrains the setting ring of the diaphragm through a yieldable coupling to the selected stop position and restores it to the wide-open position in the course of a revolution. During windup, a beveled flank on the high dwell of the cam disk oscillates the swing ring and entrains the setting ring for another brief but ineffectual reduction in the diaphragm aperture.

5 Claims, 3 Drawing Figures

DIAPHRAGM PRESELECTOR FOR CAMERA OBJECTIVE

FIELD OF THE INVENTION

Our present invention relates to an iris diaphragm for a camera equipped with a reflex-type viewfinder.

BACKGROUND OF THE INVENTION

In such cameras, especially in those provided with interchangeable objectives in which the reflex mirror must be disposed behind an iris diaphragm, it is known to provide a preselector which is adjustable to a desired stop position, the diaphragm being normally biased into its wide-open position from which it is briefly displaced into the preselected position just before the tripping of a shutter by a release button or the like. This enables the operator to use full illumination when sighting and focusing upon an object to be photographed.

Such cameras are generally equipped with a windup handle which is manually operated to advance the film, cock the shutter and possibly carry out additional functions such as reactivating the viewfinder after its disablement upon the previous exposure. With the subsequent actuation of the shutter release, by which a control member coupled with the handle is returned to its original position by a restoring spring, the motion of this control member can be utilized to displace the iris diaphragm into its selected stop position and back to its wide-open position in timed relationship with the opening and closure of the shutter. Such an arrangement, which does not use the windup stroke itself for diaphragm control, has been disclosed in German Pat. No. 2,062,230. That system comprises a cam disk executing a full forward rotation during the windup stroke and a full reverse rotation during the return stroke, a coacting cam follower being connected with the setting ring of the diaphragm through a linkage including a yieldable coupling. The linkage further comprises a relatively complicated system of levers and springs designated to facilitate the escapement of the cam follower during the next windup stroke without entrainment of the setting ring.

OBJECT OF THE INVENTION

The object of our present invention is to provide an improved preselecting mechanism of this character which is of simplified construction and has a reduced number of relatively movable parts.

SUMMARY OF THE INVENTION

In accordance with our present improvement, the linkage between the cam follower and the setting ring of the iris diaphragm comprises a swingable member having a fulcrum offset from the diaphragm axis (which is also the axis of the associated objective), the cam follower being rigid with an extremity of this member which lies substantially diametrically opposite the fulcrum with reference to that axis.

In a preferred embodiment of our invention, the swingable member comprises an oscillating ring substantially centered on the diaphragm axis at least in the wide-open position in which the cam follower engages a low dwell of the coacting cam disk, the aforementioned extremity being an extension of this ring.

BRIEF DESCRIPTION OF THE DRAWING

The above and other features of our invention will now be described in detail with reference to the accompanying drawing in which.

SPECIFIC DESCRIPTION

Figure 1:
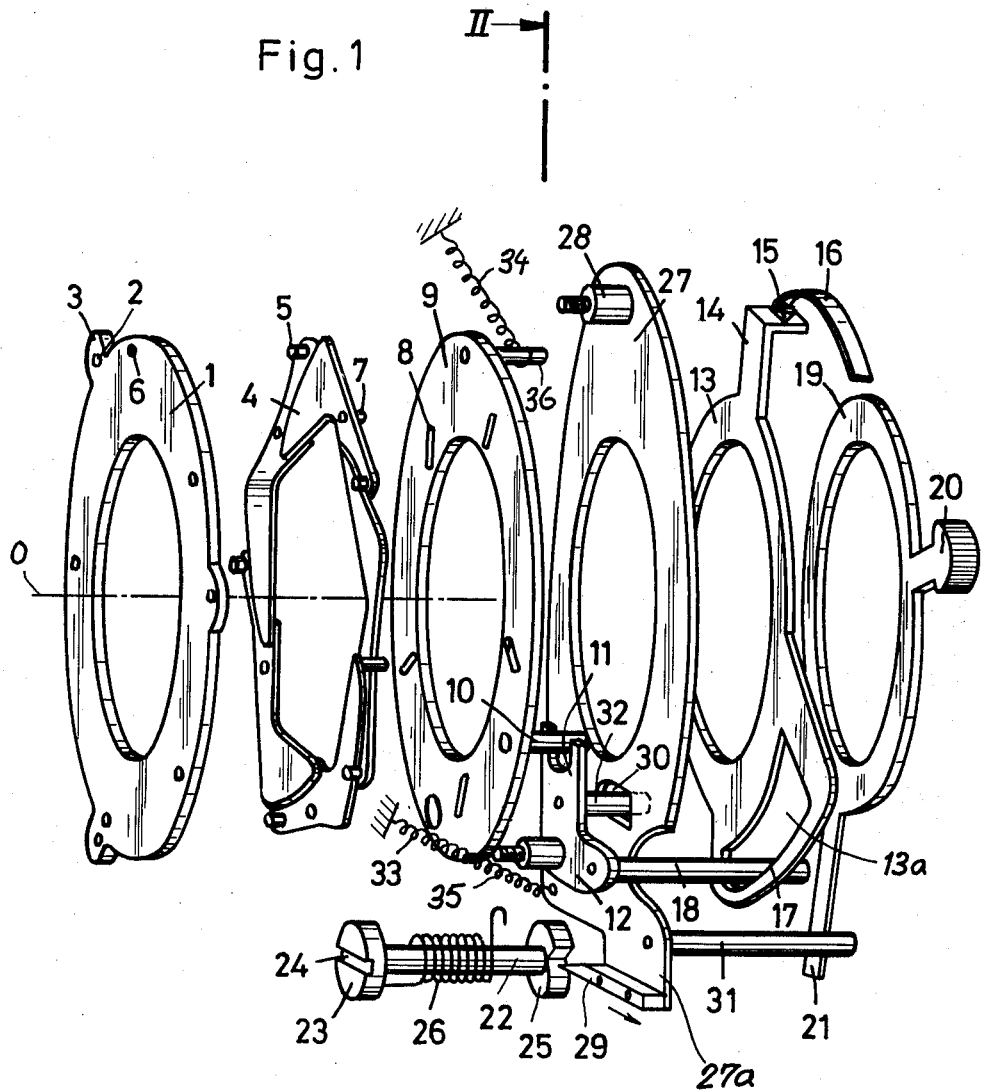
FIG. 1 is an exploded perspective view of an iris diaphragm and an associated preselecting mechanism according to our invention.
Figure 2:
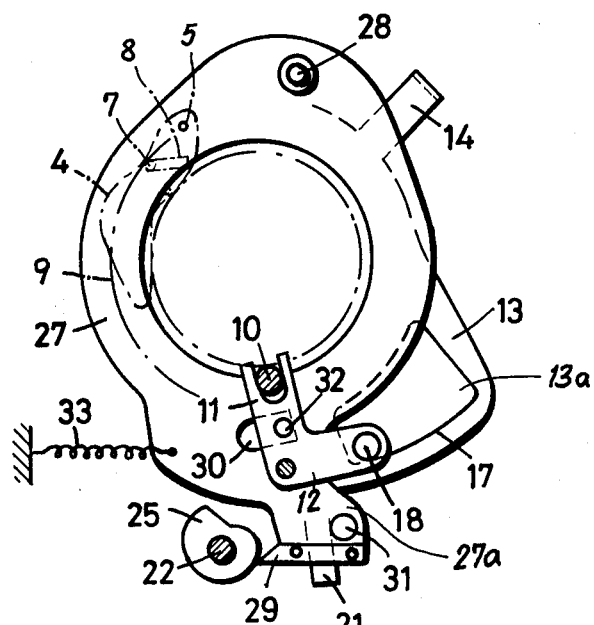
FIG. 2 is an axial view of part of the assembly, taken on the line II—II of FIG. 1.
Figure 3:
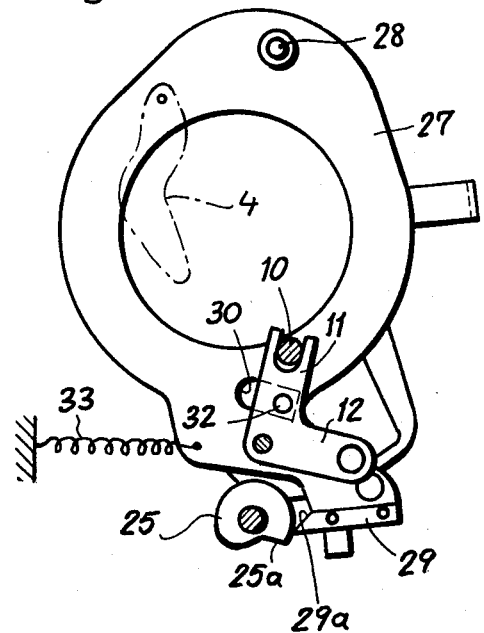
FIG. 3 is a view similar to FIG. 2, showing an alternate position.

In order to facilitate a comparison between the system of the aforementioned German Pat. No. 2,062,230 and our present improvement, the same reference numerals have been used wherever practical. The illustrated assembly comprises a mounting ring 1 of an iris diaphragm having lugs 3 with holes 2 for pins 5 of a set of iris leaves 4 having other pins 7 receivable in inclined guide slots 8 of a setting ring 9 rotatable with reference to ring 1 about a common axis O. A preselecting ring 13, centered on the same axis, carries a lug 14 with a pointer 15 co-operating with a stationary diaphragm scale 16. Ring 13 has a cutout 13a with an edge 17, not centered on the diaphragm axis, engageable by a pin 18 on an arm 12 of a bell-crank lever having a fixed fulcrum 35. A second arm 11 of this lever has a bifurcate end engaging a stud 10 which is rigid with setting ring 9. Another stud 36 on ring 9 is connected to a coil spring 34 which is anchored to the objective housing and tends to rotate the ring 9 counterclockwise (as viewed in FIGS. 2 and 3) into a wide-open position in which the iris leaves 4 are fully withdrawn as shown in FIGS. 1 and 2. With pointer 15 confronting a selected mark on scale 16, the curvature of edge 17 determines a point beyond which the ring 9 will not be able to rotate clockwise against the force of spring 34.

In accordance with our present invention, an oscillating ring 27 is swingable about a fixed fulcrum 28 on one side of the objective axis O, i.e. at the top as shown in the drawing, and is provided at its opposite side (thus at the bottom) with an extension 27a rigidly connected with a cam follower 29. The latter coacts with a cam disk 25 on a shaft 22 having a coupling head 23 provided with a slot 24 through which it is linked with a nonillustrated control element, such as a shaft of a pinion driven through approximately 360° upon the displacement of a windup handle coupled with a gear or rack in mesh with that pinion. A restoring spring 26 is tensioned during a clockwise windup stroke after which the shaft 22 and the disk 25 are latched in the position of FIG. 2, with the cam follower 29 urged by a spring 33 against a low dwell of the disk. A pin 32 on lever arm 12 passes through a slot 30 of ring 27 and is normally held against the right-hand end of that slot (as viewed in FIGS. 2 and 3) by the spring 34 acting through ring 9 and stud 10; pin 32 and slot 30 thus constitute a yieldable lost-motion coupling between setting ring 9 and cam follower 29.

Upon the tripping of the shutter release, the nonillustrated control element coupled with shaft 22 is unlatched whereupon spring 26 rotates the shaft and cam disk 25 counterclockwise. Cam follower 29, riding on the surface of disk 25, is progressively displaced toward the right and eventually comes to rest on the high dwell of the cam after about half a revolution. At or before this point, depending upon the setting of preselector ring 13, pin 18 contacts the edge 17 of that ring so that setting ring 9 is no longer entrained and iris leaves 4 occupy the selected position as diagrammatically illustrated for one of these leaves in FIG. 3. Next, the nonillustrated camera shutter is briefly opened with stoppage of the return rotation of shaft 22, if necessary, to expose the film. Thereafter, as cam disk 25 continues its rotation beyond the position of FIG. 3 into substantially its starting position in FIG. 1, cam followr 29 drops back onto the low dwell of disk 25 and restores the setting ring to normal, thereby returning the diaphragm to its wide-open position shown in FIG. 2. Swing ring 27 also reverts to its normal position centered on axis O.

During the next windup stroke, a beveled flank 25a extending from the high dwell of cam disk 25 to its low dwell coacts with an oppositely beveled edge 29a of cam follower 29 whereby setting ring 9 is again briefly rotated into and out of its preselected position; since the viewfinder is generally not used at this time, and may even be obstructed by the control mechanism, this brief reduction in the illumination of the reflex mirror is of no consequence.

As in the prior German patent referred to above, an ancillary ring 19 also centered on axis O is provided with a handle 20 by which it may be rotated to reduce the diaphragm aperture independently of the shutter release within the limits set by preselector 13, 14. Ring 19 has an extension 21 engaging a pin 31 on ring extension 27a whereby counterclockwise rotation of ring 19 separates the cam follower 29 from cam disk 25 within the limits established by curve 17 of ring 13.

The compact preselection mechanism according to our invention links the setting ring 9 and the cam follower 29 through the intermediary of only two relatively movable members forming a lost-motion coupling therebetween, i.e. the oscillating ring 27 and the bell-crank lever 11, 12 establishing a positive connection between ring 9 and pin 32; there is no need for a biasing spring acting upon that lever. This minimizes the risk of malfunction due to spring fatigue or similar mechanical failures.

We claim:

1. In a reflex camera having an iris diaphragm centered on an optical axis and provided with a setting ring rotatable about said axis, biasing means engaging said settable ring for urging same into a wide-open diaphragm position, preselector means adjustable to a desired stop position, a spring-loaded cam disk manually rotatable in one direction against its spring force during a windup stroke and rotatable by its spring force in the opposite direction during a picture-taking operation, cam-follower means coacting with said cam disk, and a linkage including a yieldable lost-motion coupling between said cam-follower means and said setting ring engageable with said preselector means for entraining said setting ring into the desired stop position, the improvement wherein said linkage comprises a swingable member having a fulcrum offset from said axis, said cam-follower means being rigid with an extremity of said member substantially diametrically opposite said fulcrum with reference to said axis.

2. The improvement defined in claim 1 wherein said member is an oscillatable ring substantially centered on said axis in said wide-open position.

3. The improvement defined in claim 2 wherein said yieldable coupling includes a pin positively connected with said setting ring and urged by said biasing means against an edge of a slot in said oscillatable ring traversed by said pin.

4. The improvement defined in claim 1 wherein said cam disk has a low dwell engaged by said cam-follower means in said wide-open position and a high dwell engaged by said cam-follower means at an intermediate point of a windup stroke, said high dwell being separated from said low dwell by a beveled flank momentarily repressing said cam-follower means during the windup stroke with subsequent re-establishment of the wide-open position at the end of said stroke.

5. The improvement defined in claim 1, further comprising ancillary diaphragm-adjusting means linked with said extremity.

* * * * *